(12) United States Patent
Sawanishi et al.

(10) Patent No.: US 10,946,470 B2
(45) Date of Patent: Mar. 16, 2021

(54) RESISTANCE SPOT WELDING METHOD AND WELDED MEMBER PRODUCTION METHOD

(71) Applicant: JFE STEEL CORPORATION, Tokyo (JP)

(72) Inventors: Chikaumi Sawanishi, Tokyo (JP); Koichi Taniguchi, Tokyo (JP); Katsutoshi Takashima, Tokyo (JP); Hiroshi Matsuda, Tokyo (JP); Rinsei Ikeda, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 242 days.

(21) Appl. No.: 16/062,407

(22) PCT Filed: Dec. 13, 2016

(86) PCT No.: PCT/JP2016/087014
§ 371 (c)(1),
(2) Date: Jun. 14, 2018

(87) PCT Pub. No.: WO2017/104647
PCT Pub. Date: Jun. 22, 2017

(65) Prior Publication Data
US 2019/0001429 A1    Jan. 3, 2019

(30) Foreign Application Priority Data

Dec. 16, 2015    (JP) .............................. JP2015-244823

(51) Int. Cl.
*B23K 11/11*    (2006.01)
*B23K 11/16*    (2006.01)

(52) U.S. Cl.
CPC ............. *B23K 11/115* (2013.01); *B23K 11/16* (2013.01); *B23K 11/166* (2013.01)

(58) Field of Classification Search
CPC ..... B23K 11/115; B23K 11/16; B23K 11/163; B23K 11/166
(Continued)

(56) References Cited

U.S. PATENT DOCUMENTS

2014/0308070 A1* 10/2014 Taniguchi ............... B23K 11/11
                                                                403/271
2016/0236294 A1    8/2016 Sawanishi et al.
2018/0079026 A1*  3/2018 Miyazaki ............... B23K 11/16

FOREIGN PATENT DOCUMENTS

JP    0471787 A    3/1992
JP    10195597 A   7/1998
(Continued)

OTHER PUBLICATIONS

Korean Office Action for Korean Application No. 10-2018-7016477, dated May 16, 2019, with Concise Statement of Relevance of Office Action, 7 pages.
(Continued)

*Primary Examiner* — Ibrahime A Abraham
*Assistant Examiner* — John J Norton
(74) *Attorney, Agent, or Firm* — RatnerPrestia

(57) ABSTRACT

Provided is a resistance spot welding method that inhibits, in accordance with the degree of axis misalignment between electrodes, the occurrence of cracking in a weld regardless of the steel grade. In resistance spot welding methods according to the present invention, H (ms) is an electrode force retaining time after completion of current passage, D (mm) is an amount of axis misalignment between the electrodes, t (mm) is a total sum of sheet thicknesses of a plurality of overlapping steel sheets, T (MPa) is a tensile strength of a steel sheet having a highest tensile strength among the plurality of steel sheets, F (N) is an electrode force, and d (mm) is a tip diameter of one electrode of the (Continued)

pair of electrodes that has a smaller tip diameter. The electrode force retaining time H is specified to be a predetermined value or greater.

12 Claims, 3 Drawing Sheets

(58) Field of Classification Search
USPC .................................... 219/86.1, 86.7, 91.2
See application file for complete search history.

(56) References Cited

FOREIGN PATENT DOCUMENTS

| | | | |
|---|---|---|---|
| JP | 2001232480 | A | 8/2001 |
| JP | 2003103377 | A | 4/2003 |
| JP | 2003236676 | A | 8/2003 |
| JP | 2004122153 | A * | 4/2004 |
| JP | 2004122153 | A | 4/2004 |
| KR | 20120017955 | A | 2/2012 |
| WO | 2015049998 | A1 | 4/2015 |

OTHER PUBLICATIONS

International Search Report and Written Opinion for International Application No. PCT/JP2016/087014, dated Feb. 7, 2017—7 pages.
Chinese Office Action for Chinese Application No. 201680073909.7, dated Nov. 6, 2019 with Concise Statement of Relevance of Office Action, 11 pages.
Extended European Search Report for European Application No. 16 875 624.5, dated Jan. 10, 2019, 7 pages.
European Communication Pursuant to Article 94(3) for European Application No. 16 875 624.5, dated Jan. 2, 2020, 5 pages.
Chinese Office Action with Search Report for Chinese Application No. 201680073909.7, dated Jul. 29, 2020, 12 pages.

* cited by examiner

RESISTANCE SPOT WELDING METHOD AND WELDED MEMBER PRODUCTION METHOD

CROSS REFERENCE TO RELATED APPLICATIONS

This is the U.S. National Phase application of PCT/JP2016/087014, filed Dec. 13, 2016, which claims priority to Japanese Patent Application No. 2015-244823, filed Dec. 16, 2015, the disclosures of these applications being incorporated herein by reference in their entireties for all purposes.

TECHNICAL FIELD OF THE INVENTION

The present invention relates to a resistance spot welding method and a welded member production method.

BACKGROUND OF THE INVENTION

A resistance spot welding method is a type of lap resistance welding method and is typically used to join overlapping steel sheets together. The welding method is performed as follows. As illustrated in FIG. 1, two or more overlapping steel sheets 1 and 2 are squeezed between a pair of electrodes 3 and 4 from above and below. While a force is being applied to the steel sheets by the upper and lower electrodes, a high welding current is passed therethrough for a short time to achieve joining. A spot weld 5 is obtained by utilizing resistive heat generated by the passage of the high welding current. The spot weld 5 is referred to as a nugget and is a portion formed as follows. When the current is applied to the overlapping steel sheets, the two steel sheets 1 and 2 melt at the region of contact between the steel sheets and solidify. In this manner, the steel sheets are joined together in the form of a spot weld.

However, in resistance spot welding, when the plurality of overlapping steel sheets of a sheet combination include a surface-treated steel sheet, there is a problem in that cracking may occur in the weld. As used herein, "surface-treated steel sheet" refers to a steel sheet including a metal coating layer on the surface of the base material (base steel sheet). Examples of the metal coating include zinc coatings, which are typified by electrogalvanized coatings, galvanized coatings (including galvannealed coatings), and coatings of a zinc alloy containing, in addition to zinc, one or more elements such as aluminum and magnesium. One cause of cracking in the weld is that the melting points of, for example, zinc coatings or zinc alloy coatings are lower than the melting points of the base materials of the surface-treated steel sheets.

That is, cracking in the weld is attributable to so-called liquid metal embrittlement. Specifically, a metal coating layer, which has a low melting point, on the surface of the steel sheet melts during spot welding. When, for example, the force of the electrodes and tensile stress due to thermal expansion and contraction of the steel sheets are applied to the weld, the molten low melting point metal penetrates the grain boundaries of the base material of the surface-treated steel sheet, which decreases the grain boundary strength, and this causes cracking in the weld. Cracking can occur in various locations, examples of which include, as illustrated in FIG. 1, one surface of the steel sheet 1, one surface of the steel sheet 2, the other surface of the steel sheet 1, and the other surface of the steel sheet 2. The one surface is the surface that comes into contact with the electrode 3 or 4. The other surfaces are the surfaces that are in contact with each other.

To take measures against cracking, Patent Literature 1, for example, proposes that the steel sheets of the sheet combination have a composition having specific ranges. Specifically, the composition is made up of, in wt %, C: 0.003 to 0.01%, Mn: 0.05 to 0.5%, P: less than or equal to 0.02%, sol. Al: less than or equal to 0.1%, Ti: 48×(N/14) to 48×{(N/14)+(S/32)}%, Nb: 93×(C/12) to 0.1%, B: 0.0005 to 0.003%, N: less than or equal to 0.01%, and Ni: less than or equal to 0.05%, with the balance being Fe and incidental impurities.

Patent Literature 2 proposes a method for spot welding a coated high strength steel sheet. In the method for spot welding a coated high strength steel sheet, the spot welding is performed with a welding time and a retaining time after current passage being set to satisfy the following conditions (1) and (2), $$0.25 \cdot (10 \cdot t+2)/50 \leq WT \leq 0.50 \cdot (10 \cdot t+2)/50 \quad (1)$$

$$300-500 \cdot t+250 \cdot t^2 \leq HT \quad (2)$$

where t: sheet thickness (mm), WT: welding time (ms), and HT: retaining time (ms) after current passage.

Patent Literature 2 also proposes performing welding by appropriately setting the welding time and the electrode retaining time after current passage in accordance with the sheet thickness of the steel sheet and by using a high tensile zinc-coated steel sheet in which the contents of alloying elements are not greater than predetermined amounts.

Patent Literature 3 proposes a method in which the current pattern is multi-step current passage including three or more steps, the welding conditions such as the welding time and the welding current are adjusted so that the appropriate current range (ΔI: a current range that enables stable formation of a nugget having a nugget diameter greater than or equal to a desired diameter with the unmelted thickness being greater than or equal to 0.05 mm) can be greater than or equal to 1.0 kA, preferably greater than or equal to 2.0 kA, and a cooling time is provided between adjacent steps.

CITATION LIST

Patent Literature

PTL 1: Japanese Unexamined Patent Application Publication No. 10-195597
PTL 2: Japanese Unexamined Patent Application Publication No. 2003-103377
PTL 3: Japanese Unexamined Patent Application Publication No. 2003-236676

SUMMARY OF THE INVENTION

However, Patent Literature 1 poses a problem in that, for example, since limitations need to be imposed on the contents of the alloying elements in the steel sheets, usable steel sheets that satisfy the required properties are limited. Thus, the application is extremely limited particularly because, currently, high-alloy steel sheets are increasingly being produced for increased strength.

Patent Literature 2 proposes a method for inhibiting cracking only for the case in which an excessively high welding current that can cause splashing is set, and does not make any reference to cracking that can occur in a state in which splashing does not occur.

Patent Literature 3 poses a problem in that optimization of the welding conditions requires many man-hours and that the method cannot be applied to steel sheets and sheet combinations for which providing an appropriate current range is difficult. In addition, neither Patent Literature 2 nor 3 considers the influence of axis misalignment between the electrodes, and therefore their measures are insufficient in some cases in view of the implementation steps in the assembly of automobiles.

Aspects of the present invention have been made in view of the above circumstances. Accordingly, an object of aspects of the invention is to propose a resistance spot welding method and a welded member production method that inhibit, in accordance with the degree of axis misalignment between electrodes, the occurrence of cracking in the weld regardless of the steel grade.

In order to achieve the above object, the inventors diligently performed studies. Cracking that occurs during or after welding can occur even when the welding conditions are in the ranges in which splashing does not occur. The inventors have found that, while the occurrence is affected by various factors, it is particularly significantly affected by an axis misalignment amount D (mm) (amount of misalignment between the central axis of the upper electrode and the central axis of the lower electrode, FIG. 2) during welding. They have found that the cracking can be inhibited by appropriately adjusting, in accordance with the axis misalignment amount, the electrode force retaining time (hereinafter also referred to as holding time) after completion of current passage.

The effects according to aspects of the present invention against cracking that occurs during or after welding cannot be described simply because various factors exert influence in a complex manner. However, presumably, the basic mechanism is follows. One cause of the occurrence of cracking in the weld is the generation of tensile stress in a state in which the coating metal of the heated surface-treated steel sheet is in contact with the base material (base steel sheet) of the surface-treated steel sheet. The tensile stress is described below. The tensile stress locally increases in some regions when the electrodes are withdrawn away from the steel sheets after completion of welding.

During current passage, the weld 5 expands to cause compressive deformation of regions around the weld, and thereafter, the weld 5 solidifies and shrinks as a result of cooling after completion of the current passage. However, as long as the force is being applied by the electrodes 3 and 4, the stress is in a state of compression because of the restraint by the electrode force or, even if in a tensile state, the stress is alleviated. However, when released from the restraint by the electrode force, the tensile stress locally increases in some regions. Cracking will occur in such regions.

Furthermore, cracking evaluation was conducted in a state in which there were various types of disturbance. As a result, it was found that, when there is an axis misalignment amount D (mm), in particular when the axis misalignment amount D (mm) is large, the probability of cracking increases. Presumably, this is because, when there is an axis misalignment, bending stress is applied to the weld, so that significant compressive plastic deformation is caused locally, and this leads to extremely high tensile stress after release of the electrodes. As discussed above, when tensile stress is applied to the weld, molten low melting point metal penetrates the grain boundaries of the base material, and this decreases the grain boundary strength and causes cracking. Thus, it was found that the occurrence of cracking can be reduced by appropriately decreasing, in accordance with the axis misalignment amount, the temperature of the weld at the time when a high tensile stress is generated and thereby inhibiting the low melting point metal from penetrating the grain boundaries of the steel sheet.

Aspects of the present invention are based on the findings described above and are as follows.

[1] A resistance spot welding method for joining together a plurality of overlapping steel sheets of a sheet combination, the method comprising squeezing the sheet combination between a pair of electrodes and passing a current through the sheet combination while applying an electrode force thereto, wherein at least one of the plurality of steel sheets is a surface-treated steel sheet including a metal coating layer and the method satisfies the following relationships, $$2 \cdot D \cdot (t \cdot T/(F \cdot d))^{1/2} \leq H \text{ when } 0 \leq D < 2$$

$$(6 \cdot D - 8) \cdot (t \cdot T/(F \cdot d))^{1/2} \leq H \text{ when } 2 \leq D < 5$$

$$(D + 17) \cdot (t \cdot T/(F \cdot d))^{1/2} \leq H \text{ when } 5 \leq D < 10$$

where H (ms) is an electrode force retaining time after completion of current passage, D (mm) is an amount of axis misalignment between the electrodes, t (mm) is a total sum of sheet thicknesses of the plurality of overlapping steel sheets, T (MPa) is a tensile strength of a steel sheet having a highest tensile strength among the plurality of steel sheets, F (N) is an electrode force, and d (mm) is a tip diameter of one electrode of the pair of electrodes, the one electrode having a smaller tip diameter than another electrode of the pair of electrodes.

[2] A resistance spot welding method for joining together a plurality of overlapping steel sheets of a sheet combination, the method comprising squeezing the sheet combination between a pair of electrodes and passing a current through the sheet combination while applying an electrode force thereto, wherein at least one of the plurality of steel sheets is a surface-treated steel sheet including a metal coating layer, the metal coating layer having a melting point lower than a melting point of a base material of the surface-treated steel sheet, and the method satisfies the following relationships, $$2 \cdot \cdot D \cdot (t \cdot T/(F \cdot d))^{1/2} \leq H \text{ when } 0 \leq D < 2$$

$$(6 \cdot D - 8) \cdot (t \cdot T/(F \cdot d))^{1/2} \leq H \text{ when } 2 \leq D < 5$$

$$(D + 17) \cdot (t \cdot T/(F \cdot d))^{1/2} \leq H \text{ when } 5 \leq D < 10$$

where H (ms) is an electrode force retaining time after completion of current passage, D (mm) is an amount of axis misalignment between the electrodes, t (mm) is a total sum of sheet thicknesses of the plurality of overlapping steel sheets, T (MPa) is a tensile strength of a steel sheet having a highest tensile strength among the plurality of steel sheets, F (N) is an electrode force, and d (mm) is a tip diameter of one electrode of the pair of electrodes, the one electrode having a smaller tip diameter than another electrode of the pair of electrodes.

[3] A resistance spot welding method for joining together a plurality of overlapping steel sheets of a sheet combination, the method comprising squeezing the sheet combination between a pair of electrodes and passing a current through the sheet combination while applying an electrode force thereto, wherein at least one of the plurality of steel sheets is a surface-treated steel sheet including a metal coating layer, and the method satisfies the following relationships, $$2 \cdot D \cdot (t \cdot T \cdot R/(40 \cdot F \cdot d))^{1/2} \leq H \text{ when } 0 \leq D < 2$$

$$(6 \cdot D - 8) \cdot (t \cdot T \cdot R/(40 \cdot F \cdot d))^{1/2} \leq H \text{ when } 2 \leq D < 5$$

$$(D+17) \cdot (t \cdot T \cdot R/(40 \cdot F \cdot d))^{1/2} \leq H \text{ when } 5 \leq D < 10$$

where H (ms) is an electrode force retaining time after completion of current passage, D (mm) is an amount of axis misalignment between the electrodes, t (mm) is a total sum of sheet thicknesses of the plurality of overlapping steel sheets, T (MPa) is a tensile strength of a steel sheet having a highest tensile strength among the plurality of steel sheets, F (N) is an electrode force, d (mm) is a tip diameter of one electrode of the pair of electrodes, the one electrode having a smaller tip diameter than another electrode of the pair of electrodes, and R (mm) is an electrode tip radius of curvature of one electrode of the pair of electrodes, the one electrode having a smaller electrode tip radius of curvature than another of the pair of electrodes, R satisfying $4 \leq R \leq 200$.

[4] A resistance spot welding method for joining together a plurality of overlapping steel sheets of a sheet combination, the method comprising squeezing the sheet combination between a pair of electrodes and passing a current through the sheet combination while applying an electrode force thereto, wherein at least one of the plurality of steel sheets is a surface-treated steel sheet including a metal coating layer, the metal coating layer having a melting point lower than a melting point of a base material of the surface-treated steel sheet, and the method satisfies the following relationships, $$2 \cdot D \cdot (t \cdot T \cdot R/(40 \cdot F \cdot d))^{1/2} \leq H \text{ when } 0 \leq D < 2$$

$$(6 \cdot D - 8) \cdot (t \cdot T \cdot R/(40 \cdot F \cdot d))^{1/2} \leq H \text{ when } 2 \leq D < 5$$

$$(D+17) \cdot (t \cdot T \cdot R/(40 \cdot F \cdot d))^{1/2} \leq H \text{ when } 5 \leq D < 10$$

where H (ms) is an electrode force retaining time after completion of current passage, D (mm) is an amount of axis misalignment between the electrodes, t (mm) is a total sum of sheet thicknesses of the plurality of overlapping steel sheets, T (MPa) is a tensile strength of a steel sheet having a highest tensile strength among the plurality of steel sheets, F (N) is an electrode force, d (mm) is a tip diameter of one electrode of the pair of electrodes, the one electrode having a smaller tip diameter than another electrode of the pair of electrodes, and R (mm) is an electrode tip radius of curvature of one electrode of the pair of electrodes, the one electrode having a smaller electrode tip radius of curvature than another of the pair of electrodes, R satisfying $40 \leq R \leq 200$.

[5] The resistance spot welding method according to any one of [1] to [4], wherein D is greater than or equal to 0.5.

[6] The resistance spot welding method according to any one of [1] to [5], wherein the metal coating layer is a Zn-based coating layer or an Al-based coating layer.

[7] The resistance spot welding method according to any one of [1] to [6], wherein at least one of the plurality of steel sheets has a tensile strength greater than or equal to 590 MPa.

[8] The resistance spot welding method according to any one of [1] to [7], wherein, when there are one or more existing welds around a welding point, a distance L between a center of the welding point and a center of one existing weld of the one or more existing welds is set to greater than or equal to 6.0 mm to perform welding, the one existing weld being closest to the welding point, among the one or more existing welds.

[9] A method for producing a welded member, the method comprising the steps of:

providing a sheet combination by arranging a plurality of steel sheets to overlap each other, at least one of the steel sheets being a surface-treated steel sheet including a metal coating layer; and welding the sheet combination by using the resistance spot welding method according to any one of [1] to [8].

In accordance with aspects the present invention, the occurrence of cracking in the weld is inhibited regardless of the steel grade.

DETAILED DESCRIPTION OF EMBODIMENTS OF THE INVENTION

Figure 1:
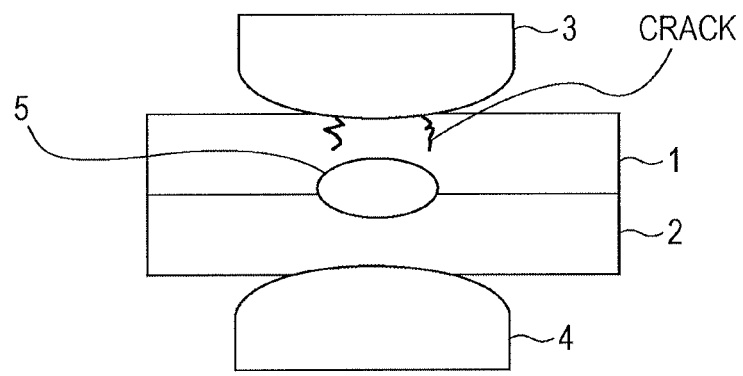
FIG. 1 is a diagram illustrating a resistance spot welding method.
Figure 2:
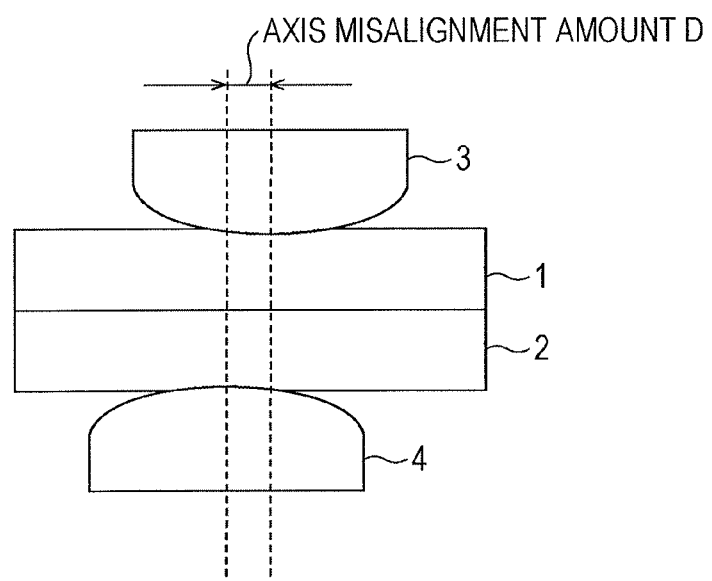
FIG. 2 is a diagram illustrating an axis misalignment between electrodes in the resistance spot welding method.

Embodiments of the present invention will be described in detail below.

One aspect of the present invention is a resistance spot welding method for joining together a plurality of overlapping steel sheets of a sheet combination. The sheet combination is squeezed between a pair of electrodes and a current is passed through the sheet combination while an electrode force is applied thereto. The method includes a step of retaining the electrode force after completion of the current passage. Aspects of the present invention are applied to a resistance spot welding method for a sheet combination of a plurality of steel sheets at least one of which is a surface-treated steel sheet including a metal coating layer. It is preferable that the metal coating layer has a melting point lower than the melting point of the base material of the surface-treated steel sheet.

A welder usable in the resistance spot welding method of aspects of the present invention may be a welder including a pair of upper and lower electrodes and in which the electrode force and the welding current can be individually controlled as desired during welding. With regard to the welder, there are no particular limitations on, for example, the force application mechanism (e.g., air cylinder or servo motor), the type (e.g., stationary or robot gun), and the shape of the electrodes. Examples of the type of the electrode tip include the dome radius type (DR type), the radius type (R type), and the dome type (D type), all specified in JIS C 9304: 1999.

Aspects of the present invention satisfy the following relationships, $$2 \cdot D \cdot (t \cdot T/(F \cdot d))^{1/2} \leq H \text{ when } 0 \leq D < 2$$

$$(6 \cdot D - 8) \cdot (t \cdot T/(F \cdot d))^{1/2} \leq H \text{ when } 2 \leq D < 5$$

$$(D + 17) \cdot (t \cdot T/(F \cdot d))^{1/2} \leq H \text{ when } 5 \leq D < 10$$

where H (ms) is an electrode force retaining time (hereinafter also referred to as holding time) after completion of current passage, D (mm) is an amount of axis misalignment between the electrodes, t (mm) is a total sum of the sheet thicknesses of a plurality of overlapping steel sheets, T (MPa) is a tensile strength of a steel sheet having a highest tensile strength among the plurality of steel sheets, F (N) is an electrode force, and d (mm) is a tip diameter of one electrode of the pair of electrodes, the one electrode having a smaller tip diameter than another electrode of the pair of electrodes. Furthermore, in the above formulas, when the axis misalignment amount D is, specifically, greater than or equal to 0.5 (mm), aspects of the present invention satisfy the following relationships, $$2 \cdot D \cdot (t \cdot T/(F \cdot d))^{1/2} \leq H \text{ when } 0.5 \leq D < 2$$

$$(6 \cdot D - 8) \cdot (t \cdot T/(F \cdot d))^{1/2} \leq H \text{ when } 2 \leq D < 5$$

$$(D + 17) \cdot (t \cdot T/(F \cdot d))^{1/2} \leq H \text{ when } 5 \leq D < 10.$$

The holding time H is an electrode force retaining time after completion of current passage and is a period of time that lasts from the completion of current passage to the time at which the electrodes are released from the steel sheets. The time at which the electrodes are released from the steel sheets refers to the time at which the electrodes are separated from the steel sheets. The electrode force F is an electrode force at the completion of current passage. In the case where a plurality of current passages are performed, the electrode force F is an electrode force at the completion of the final current passage. The electrode force during current passage may or may not be constant. The electrode axis misalignment amount D is constant during the current passage and the process of retaining the electrode force, i.e., the electrode force at the completion of the current passage. In the present specification, the electrode force F in the step of retaining the electrode force after completion of current passage is a measured value.

Because of this configuration, even when there is an axis misalignment, e.g., when the axis misalignment amount is greater than or equal to 0.5 mm, at which cracking is more likely to occur during or after spot welding, the temperature of the weld at the occurrence of tensile stress is lowered. This prevents liquid metal embrittlement due to the metal coating layer (zinc, for example) of the surface-treated steel sheet. Specifically, the coating metal becomes molten temporarily when it is heated by the current passage for welding, but a holding time longer than or equal to a certain length is provided in accordance with the axis misalignment amount, thereby lowering the temperature of the weld. As a result, by the time tensile stress is generated thereafter when the electrodes are released, the coating metal will have solidified and thus the coating metal will not penetrate the grain boundaries. Consequently, the occurrence of cracking is reduced. Spot welding is performed with the electrodes being constantly water cooled. Thus, when the holding time is extended, the cooling rate increases, and therefore the temperature of the weld at the time the tensile stress is generated can be lowered. When the solidification of the metal coating layer only is taken into account, a longer holding time may be preferred. However, in accordance with aspects of the present invention, the holding time need not be longer than necessary and, for example, the holding time may be set to a time period close to the lower limit that satisfies the formulas. This results in a resistance spot welding method that inhibits the occurrence of cracking and achieves good productivity. For example, the holding time H may be less than or equal to 30 ms.

As described above, when there is an axis misalignment, bending stress is applied to the weld, and as a result, significant compressive plastic deformation is caused locally, and this leads to extremely high tensile stress after release of the electrodes. Thus, it is important to appropriately adjust the holding time in accordance with the axis misalignment amount.

Specifically, when the axis misalignment amount is in the range from greater than or equal to 0 mm to less than 2 mm, the bending stress applied to the weld due to the axis misalignment is relatively small. As a result, the tensile stress that is generated in the weld after release of the electrodes is not significantly high. Thus, the amount of increase of the holding time with respect to the axis misalignment amount may be small.

When the axis misalignment amount is in the range from greater than or equal to 2 mm to less than 5 mm, the amount of increase in the tensile stress that is generated in the weld after release of the electrodes becomes noticeable as the axis misalignment amount increases. Thus, it is necessary to correspondingly increase the holding time in accordance with the amount of increase in the tensile stress.

Here, an axis misalignment amount of 2 mm means an axis misalignment amount of substantially 2.0 mm, and an axis misalignment amount of 5 mm means an axis misalignment amount of substantially 5.0 mm.

When the axis misalignment amount is in the range from greater than or equal to 5 mm to less than 10 mm, the tensile stress that is generated in the weld is very high. However, the electrodes are not released before the temporarily molten metal coating completely solidifies, and this prevents the occurrence of cracking. When there is no remaining molten metal coating, no cracking will occur. When the axis misalignment amount is in the range from greater than or equal to 5 mm to less than 10 mm, a holding time sufficient for the molten metal coating to solidify is provided, and therefore the amount of increase of the holding time with respect to the axis misalignment amount may be small. However, when the axis misalignment amount is large, the distance between the nugget and the electrode tip is large, and therefore the cooling rate of the weld tends to decrease. For this reason, it is desirable to increase the holding time by an amount greater than or equal to a certain amount in accordance with the axis misalignment amount.

In the case that the axis misalignment amount is greater than or equal to 10 mm, formation of a suitable nugget between the upper and lower electrodes is difficult. Thus, such a case is not considered here.

The foregoing description describes the relationship between the axis misalignment and the holding time for cracking that occurs during or after welding. In the following, other influential factors associated with cracking that occurs during or after welding will also be described.

When the total sum t of the sheet thicknesses of steel sheets to be welded is large, sufficient heat removal to the electrode cannot be accomplished. This results in a decreased cooling rate of the weld and high restraint of the weld. As a result, the probability of cracking increases.

Similarly, when a steel sheet to be welded has a high tensile strength T, high restraint of the weld occurs and a high tensile stress is generated in the weld after release of the electrodes. As a result, the probability of cracking increases.

When the electrode force F of the electrode is large, discharge of the molten metal coating to areas around the weld is facilitated. As a result, in the proximity of the weld, the amount of contact of the metal coating with the base material will decrease, which will inhibit the occurrence of cracking.

When the electrode tip diameter d is large, the area of contact between the electrode and the steel sheet is large. Thus, the stress at the time of force application will be distributed, and as a result, local bending stress will be reduced. In addition, heat removal to the electrodes is facilitated, and as a result, the occurrence of cracking is inhibited. However, if the electrode tip diameter d is excessively large, the contact between the steel sheets will be unstable. Thus, it is desirable that the electrode tip diameter d be in the range of approximately 4 mm≤d≤approximately 10 mm.

For these reasons, the above formulas have been found. The coefficients in the formulas are optimal coefficients determined by experiment in accordance with the axis misalignment amount.

Furthermore, to reduce cracking in the case, for example, where the sheet combination has a high probability of cracking or where welding is performed in a state in which the restraint of the weld is high, it is preferable that the following relationships be satisfied, $3 \cdot D \cdot (t \cdot T/(F \cdot d))^{1/2} \leq H$ when $0 \leq D < 2$ $(10 \cdot D - 14) \cdot (t \cdot T/(F \cdot d))^{1/2} \leq H$ when $2 \leq D < 5$ $(D+31) \cdot (t \cdot T/(F \cdot d))^{1/2} \leq H$ when $5 \leq D < 10$.

More desirably, it is preferable that the following relationships be satisfied, $4 \cdot D \cdot (t \cdot T/(F \cdot d))^{1/2} \leq H$ when $0 \leq D < 2$ $(15 \cdot D - 22) \cdot (t \cdot T/(F \cdot d))^{1/2} \leq H$ when $2 \leq D < 5$ $(D+48) \cdot (t \cdot T/(F \cdot d))^{1/2} \leq H$ when $5 \leq D < 10$.

Figure 3:
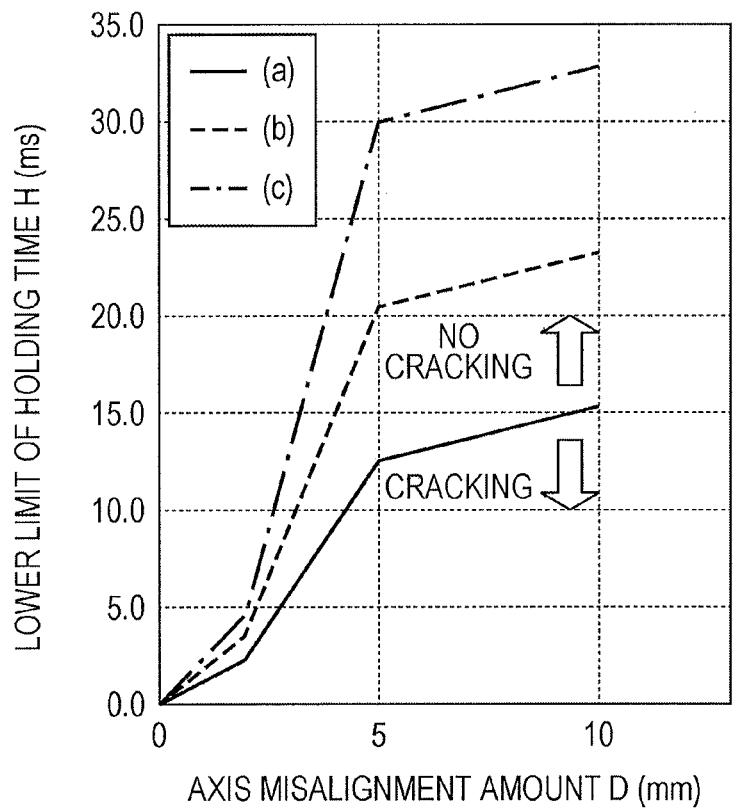
FIG. 3 is a conceptual diagram illustrating formulas satisfied by the resistance spot welding method of the present invention.

FIG. 3 is a conceptual diagram illustrating the formulas that are satisfied by the above-described resistance spot welding method of aspects of the present invention ((a) in FIG. 3), the formulas that are preferably satisfied ((b) in FIG. 3), and the formulas that are more preferably satisfied ((c) in FIG. 3). FIG. 3 is a diagram illustrating a case in which, in the formulas, the electrode tip diameter is 6 mm, the total sum t of sheet thicknesses is 3.2 mm, the tensile strength T is 1500 MPa, and the electrode force F is 2500 N.

Furthermore, by optimizing a radius of curvature R of the tip of the electrodes to be used, the effects of aspects of the present invention are more effectively produced. If the R is less than 40 mm, the bending stress that is generated by axis misalignment is large, and as a result, the probability of cracking increases.

On the other hand, if R is excessively large, the area of contact between each of the electrodes and the corresponding steel sheet is large. Thus, pressure applied between the steel sheets is low and the contact between the steel sheets is unstable, and as a result, the probability of splashing increases. When splashing occurs, the molten metal splashes to surrounding regions so that the volume of the weld decreases. Thus, the electrode becomes significantly pressed into the steel sheet to cause a large tension force to be applied to the surface of the steel sheet. As a result, the probability of cracking increases.

In view of the above, cracking is effectively inhibited by specifying the electrode tip radius of curvature R (mm) to be in the range, 40≤R<200, and satisfying the following relationships, $2 \cdot D \cdot (t \cdot T \cdot R/(40 \cdot F \cdot d))^{1/2} \leq H$ when $0 \leq D < 2$ $(6 \cdot D - 8) \cdot (t \cdot T \cdot R/(40 \cdot F \cdot d))^{1/2} \leq H$ when $2 \leq D < 5$ $(D+17) \cdot (t \cdot T \cdot R/(40 \cdot F \cdot d))^{1/2} \leq H$ when $5 \leq D < 10$.

Furthermore, in the above formulas, when the axis misalignment amount D is, specifically, greater than or equal to 0.5 (mm), the following are satisfied, $2 \cdot D \cdot (t \cdot T \cdot R/(40 \cdot F \cdot d))^{1/2} \leq H$ when $0.5 \leq D < 2$ $(6 \cdot D - 8) \cdot (t \cdot T \cdot R/(40 \cdot F \cdot d))^{1/2} \leq H$ when $2 \leq D < 5$ $(D+17) \cdot (t \cdot T \cdot R/(40 \cdot F \cdot d))^{1/2} \leq H$ when $5 \leq D < 10$.

Furthermore, to reduce cracking in the case, for example, where the sheet combination has a high probability of cracking or where welding is performed in a state in which the restraint of the weld is high, it is preferable that the following relationships be satisfied, $3 \cdot D \cdot (t \cdot T \cdot R/(40 \cdot F \cdot d))^{1/2} \leq H$ when $0 \leq D < 2$ $(10 \cdot D - 14) \cdot (t \cdot T \cdot R/(40 \cdot F \cdot d))^{1/2} \leq H$ when $2 \leq D < 5$ $(D+31) \cdot (t \cdot T \cdot R/(40 \cdot F \cdot d))^{1/2} \leq H$ when $5 \leq D < 10$.

More desirably, it is preferable that the following relationships be satisfied, $4 \cdot D \cdot (t \cdot T \cdot R/(40 \cdot F \cdot d))^{1/2} \leq H$ when $0 \leq D < 2$ $(15 \cdot D - 22) \cdot (t \cdot T \cdot R/(40 \cdot F \cdot d))^{1/2} \leq H$ when $2 \leq D < 5$ $(D+48) \cdot (t \cdot T \cdot R/(40 \cdot F \cdot d))^{1/2} \leq H$ when $5 \leq D < 10$.

Thus, the holding time is set to be greater than or equal to a certain length in accordance with the axis misalignment amount D, and as a result, cracking is inhibited. However, an excessive increase in the cooling rate can decrease the toughness of the nugget, and therefore it is desirable that the upper limit of the holding time H be 2000 ms.

The tensile strength T of the steel sheet is not particularly limited and, for example, may range from 250 MPa to 2000 MPa. However, as described above, the probability of cracking increases when the tensile strength of the sheet combination is high. Thus, when aspects of the present invention are applied to a sheet combination of steel sheets at least one of which has a tensile strength greater than or equal to 590 MPa, a better effect is produced. In particular, when at least one of the steel sheets of the sheet combination has a tensile strength greater than or equal to 780 MPa, a more enhanced effect is produced.

Figure 4:
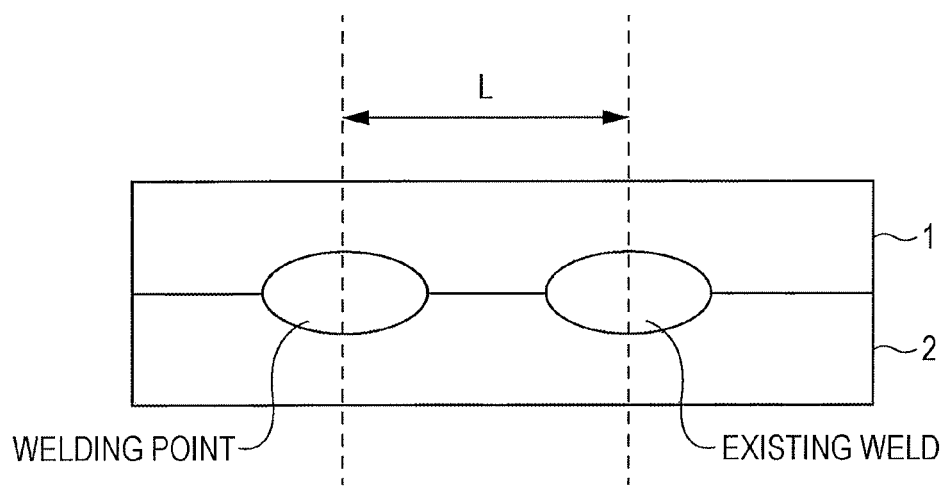
FIG. 4 is a diagram illustrating a distance between a center of a welding point and a center of an existing weld.

When there is an existing weld near a welding point to which welding is applied, deformation of the steel sheets is restricted by the existing weld and thus the welding is performed under very high restraint. This results in generation of a high tensile stress in the weld, which increases the probability of cracking. Thus, as illustrated in FIG. 4, when there are one or more existing welds around a welding point, a center-to-center distance L may be set to greater than or equal to 6.0 mm, so that the effect of inhibiting the occurrence of cracking in the weld can be further enhanced. The center-to-center distance L is defined as a distance between a center of the welding point and a center of one existing weld, of the one or more existing weld, that is closest to the welding point. The center of the welding point refers to the center of the nugget at the faying surfaces of the welded steel sheets. The shape of the nugget at the faying surfaces of the welded steel sheets is circular or ellipsoid with the center of the ellipsoid being the intersection point of the major and minor axes. When the shape is other than circular or ellipsoid, the center-to-center distance L is determined by designating the center of gravity of the shape at the faying surfaces as the center.

In the case where, for example, a sheet combination has a high probability of cracking or the axis misalignment amount D is large, it is preferable that the center-to-center distance L be greater than or equal to 8.0 mm. Further desirably, it is more preferable that the center-to-center distance L be greater than or equal to 10.0 mm.

The steel grades of steel sheets of a sheet combination for use in accordance with aspects of the present invention are not particularly limited. The steel sheets may be produced by any method, for example, by cold rolling or hot rolling, and also, the steel sheets may be of any structure. The steel sheets of a sheet combination for use in accordance with aspects of the present invention may be hot press-formed steel sheets, of course. Furthermore, the sheet thicknesses of the steel sheets may be any thicknesses provided that they are within a range (approximately 0.5 to 4.0 mm) that can be used for typical automobile bodies.

Also, the metal coating layer of the surface-treated steel sheet including the metal coating layer may have any composition. As described above, one cause of cracking in the weld is melting of the metal coating layer, which has a low melting point. Thus, the effect of inhibiting cracking in the weld is enhanced in the case where the coating layer has a melting point lower than that of the base material. The melting point of the base material (base steel sheet) ranges from 1400 to 1570° C., for example, and the melting point of the metal coating layer ranges from 300 to 1200° C., for example. The melting points of typical coating layers are lower than those of steel sheets. Examples of the metal coating layers include Zn-based coating layers and Al-based coating layers. For parts that require good corrosion resistance, Zn-based coatings are better than Al-based coatings. This is because the sacrificial corrosion protection by Zn, zinc, reduces the corrosion rate of the base steel sheet. Examples of the Zn-based coatings include typical coatings such as galvanized (GI), galvannealed (GA), electrogalvanized (EG), Zn—Ni-based (e.g., a Zn—Ni-based coating containing 10 to 25 mass % Ni), Zn—Al-based, Zn—Mg-based, and Zn—Al—Mg-based. Examples of the Al-based coatings include Al—Si-based coatings (e.g., an Al—Si-based coating containing 10 to 20 mass % Si). The metal coating layer may be provided on one side of the surface-treated steel sheet or may be provided on both sides thereof. The coating weight of the coating is also not limited, but when the weldability is to be taken into account, it is desirable that the coating weight be less than or equal to 120 g/m² per side.

The sheet combination in accordance with aspects of the present invention is not particularly limited, and may be a combination of a plurality of overlapping steel sheets of the same grade or a combination of a plurality of overlapping steel sheets of different grades. The steel sheets may have different sheet thicknesses, of course. The combination may be a combination of a steel sheet including a metal coating layer having a melting point lower than that of the steel sheet and a steel sheet not including a metal coating layer.

Furthermore, the current, welding time, and electrode force during current passage may be constant or may not be constant. The current and/or the electrode force may be varied in two or more steps. Between adjacent steps, a cooling time may be provided. Furthermore, it is of course possible to employ a controlling method that monitors parameters such as the resistance and voltage during welding and changes the current and/or the welding time in accordance with the variations.

The following describes preferred ranges of the current, the welding time, and the electrode force during current passage in the case where welding is performed by one-step current passage. The current during current passage is preferably less than 10 kA, for example. The welding time preferably ranges from 200 ms to 700 ms, for example. The electrode force during current passage preferably ranges from 2000 N to 7000 N, for example.

In the case of multi-step current passage, in which previous and subsequent currents are applied for a short time before and after the main current, the upper limit of the preferred current can be extended to 15 kA. Also, the upper limit of the preferred welding time can be extended to 1000 ms. The welding time in the case of multi-step current passage is the total sum of the welding times of all the steps.

When performing welding, the welding may be performed, for example, in a state in which a gap is present between the steel sheets and/or in a state in which the electrodes are tilted with respect to the steel sheets.

The use of the above-described resistance spot welding method according to aspects of the present invention enables production of a welded member formed of a plurality of welded steel sheets at least one of which is a surface-treated steel sheet including a metal coating layer. Specifically, the welded member production method of aspects of the present invention is a welded member production method including a step of providing a sheet combination by arranging a plurality of steel sheets to overlap each other, at least one of the steel sheets being a surface-treated steel sheet including a metal coating layer, and a step of welding the sheet combination by the resistance spot welding method described above. When welding is performed by using the resistance spot welding method described above, the occurrence of cracking in the weld is inhibited, and as a result, a welded member having a weld with reduced cracking is produced.

EXAMPLES

Figure 5:
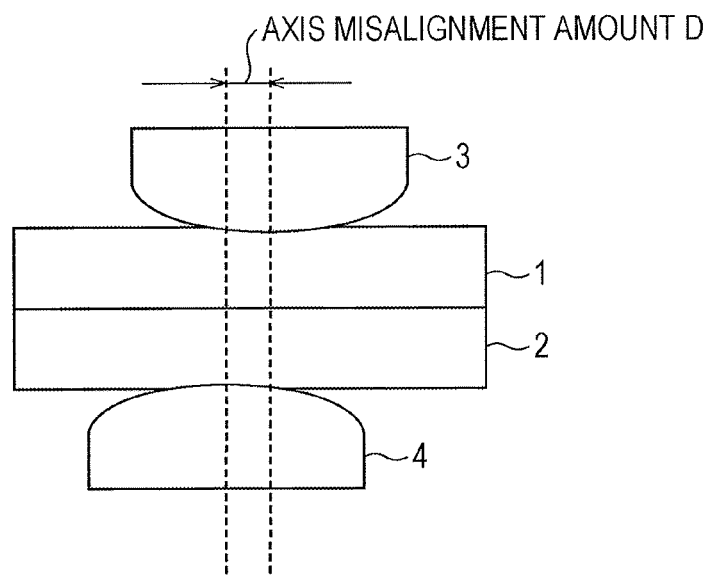
FIG. 5 is a diagram illustrating a test method in examples in the case where a sheet combination of two overlapping sheets is used.
Figure 6:
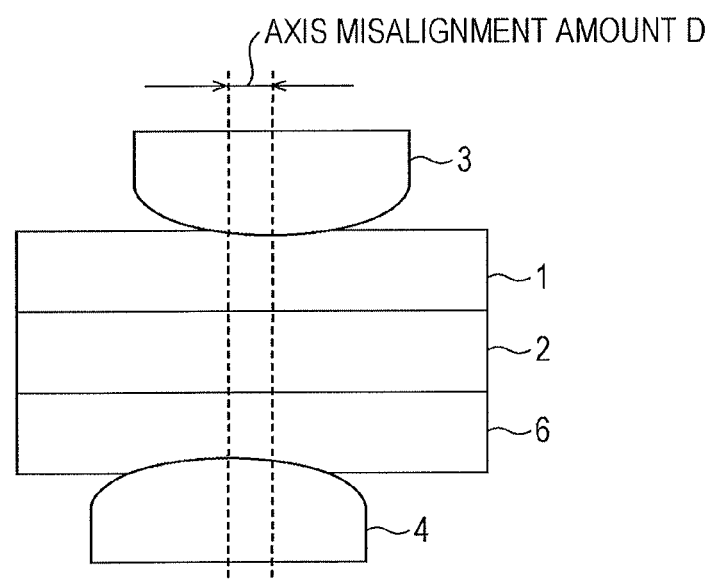
FIG. 6 is a diagram illustrating a test method in examples in the case where a sheet combination of three overlapping sheets is used.

The following describes examples according to the present invention. Resistance spot welding was performed on sheet combinations, each of which included two or three overlapping sheets, to produce joints (welded members). The sheet combinations are shown in Table 1, and the conditions used are shown in Table 2 (Table 2-1 to Table 2-3). In the specimens of this example, the melting point of the base material ranges from 1400 to 1570° C., the melting point of the galvanized coating (GI) ranges from 400 to 500° C., and the melting point of the galvannealed coating (GA) ranges from 600 to 950° C. The tensile strengths shown in Table 1 are tensile strengths determined in the following manner. From each of the steel sheets, a JIS No. 5 tensile test specimen was taken in a direction parallel to the rolling direction, and a tensile test was conducted according to JIS Z 2241: 2011. In Table 2, the electrode forces F in the step of retaining the electrode force after completion of current passage are measured values. FIG. 5 illustrates a test method in the case where the sheet combination was made up of two overlapping steel sheets 1 and 2. FIG. 6 illustrates a test method in the case where the sheet combination was made up of three overlapping steel sheets 1, 2, and 6. In Table 2, "No" in the column "existing weld" indicates that there was no existing weld around the welding point to be evaluated. When there was an existing weld, the distance L between the center of the welding point and the center of the existing weld is shown in the column "existing weld" in Table 2. The welding conditions for the weld to be evaluated were the same as those for the existing weld.

The welder used was an inverter DC resistance spot welder, and the electrodes used were chromium copper electrodes of DR-type. The tip diameters and the tip radii of curvature of the electrodes used are also shown in Table 2. The two electrodes used were identical. The current passage was performed once and the current (welding current) during the current passage was constant. The axis misalignment amount was constant during the current passage and the process of retaining the electrode force, i.e., the electrode force at the completion of the current passage. The electrode force was the electrode force at the completion of the current passage, and was constant during the current passage and the process of retaining the electrode force at the completion of the current passage. Furthermore, the resistance spot welding was performed at room temperature, and was performed with the electrodes being water cooled constantly.

In each of the obtained joints, the weld was cut in the sheet thickness direction of the steel sheets, and the cross section was mirror polished to be examined for the presence or absence of cracks by using a scanning electron microscope (at a magnification of 2000 times). Ten joints were produced and examined under the same conditions, and the results were determined based on the following criteria. A to C were evaluations of ○ (pass) and F was an evaluation of × (fail).

A: All the ten joints were free of cracks.
B: Among the ten joints, one joint had a crack less than 10 μm in length, and all the ten joints were free of cracks greater than or equal to 10 μm in length.
C: Among the ten joints, two joints had a crack less than 10 μm in length, and all the ten joints were free of cracks greater than or equal to 10 μm in length.
F: Among the ten joints, three or more joints had a crack less than 10 μm in length, or among the ten joints, one or more joints had a crack greater than or equal to 10 μm in length.

The joints produced by setting a holding time that satisfies the present invention (examples) all had one of the evaluations A to C (○ (pass)) regardless of the presence or absence of splashing.

TABLE 1

| Sheet combination No. | Steel sheet 1 | | | Steel sheet 2 | | | Steel sheet 6 | | |
|---|---|---|---|---|---|---|---|---|---|
| | Sheet thickness (mm) | Tensile strength (MPa) | Coating type | Sheet thickness (mm) | Tensile strength (MPa) | Coating type | Sheet thickness (mm) | Tensile strength (MPa) | Coating type |
| A | 1.6 | 980 | Galvannealed (GA) | 1.6 | 980 | Galvannealed (GA) | | | |
| B | 1.6 | 980 | Galvanized (GI) | 1.6 | 980 | Galvanized (GI) | | | |
| C | 1.6 | 980 | Galvannealed (GA) | 1.4 | 270 | No coating | | | |
| D | 1.4 | 980 | Galvannealed (GA) | 1.6 | 980 | Galvannealed (GA) | 1.4 | 980 | No coating |
| E | 1.0 | 980 | Galvanized (GI) | 1.0 | 980 | Galvanized (GI) | | | |
| F | 1.0 | 980 | No coating | 1.0 | 980 | Galvannealed (GA) | 1.0 | 590 | No coating |
| G | 1.8 | 1180 | Galvannealed (GA) | 1.8 | 1180 | Galvannealed (GA) | | | |
| H | 1.8 | 1470 | No coating | 1.8 | 980 | Galvannealed (GA) | | | |
| I | 2.0 | 980 | Galvannealed (GA) | 2.0 | 980 | Galvannealed (GA) | | | |
| J | 1.6 | 980 | Galvanized (GI) | 1.0 | 270 | Galvannealed (GA) | | | |
| K | 2.0 | 980 | Galvannealed (GA) | 1.0 | 270 | Galvannealed (GA) | | | |
| L | 1.8 | 1180 | Galvannealed (GA) | 1.0 | 270 | No coating | | | |
| M | 1.8 | 1180 | Galvanized (GI) | 1.0 | 270 | No coating | | | |
| N | 1.6 | 1470 | Galvanized (GI) | 1.2 | 270 | Galvannealed (GA) | | | |
| O | 1.6 | 980 | Galvannealed (GA) | 1.6 | 1470 | Galvannealed (GA) | 1.0 | 270 | Galvannealed (GA) |
| P | 1.6 | 1180 | Galvannealed (GA) | 2.0 | 1180 | Galvannealed (GA) | 1.2 | 270 | Galvannealed (GA) |
| Q | 1.6 | 1180 | Galvanized (GI) | 1.8 | 1180 | No coating | 1.2 | 270 | Galvannealed (GA) |
| R | 1.2 | 1180 | Galvanized (GI) | 1.4 | 270 | Galvanized (GI) | | | |
| S | 2.0 | 980 | Galvanized (GI) | 2.2 | 1180 | Galvanized (GI) | 2.0 | 1180 | Galvanized (GI) |
| T | 2.2 | 1180 | Galvanized (GI) | 1.0 | 270 | Galvanized (GI) | | | |

TABLE 2

| Condition No. | Sheet combination No. | Axis misalignment amount (mm) | Applied formula | Electrode tip diameter (mm) | Electrode tip radius of curvature (mm) | Electrode force (N) | Welding current (kA) | Welding time (ms) | Result of applied formula | Holding time (ms) | Cracking evaluation | Existing weld | |
|---|---|---|---|---|---|---|---|---|---|---|---|---|---|
| 1 | A | 0 | $2 \cdot D \cdot (t \cdot T/(F \cdot d))^{1/2}$ | 6 | 40 | 3500 | 6.0 | 320 | 0.00 | 10 | ○(A) | No | Example |
| 2 | A | 1 | $2 \cdot D \cdot (t \cdot T/(F \cdot d))^{1/2}$ | 6 | 40 | 3500 | 6.0 | 320 | 0.77 | 10 | ○(A) | No | Example |
| 3 | A | 2 | $(6 \cdot D - 8) \cdot (t \cdot T/(F \cdot d))^{1/2}$ | 6 | 40 | 3500 | 6.0 | 320 | 1.55 | 20 | ○(A) | No | Example |
| 4 | A | 2 | $(6 \cdot D - 8) \cdot (t \cdot T/(F \cdot d))^{1/2}$ | 8 | 100 | 4500 | 7.0 | 320 | 1.18 | 20 | ○(A) | No | Example |
| 5 | A | 2 | $(6 \cdot D - 8) \cdot (t \cdot T/(F \cdot d))^{1/2}$ | 4 | 100 | 4500 | 6.0 | 320 | 1.67 | 100 | ○(A) | No | Example |
| 6 | A | 5 | $(D + 17) \cdot (t \cdot T/(F \cdot d))^{1/2}$ | 6 | 40 | 3500 | 6.0 | 320 | 8.50 | 100 | ○(A) | No | Example |
| 7 | A | 9 | $(D + 17) \cdot (t \cdot T/(F \cdot d))^{1/2}$ | 6 | 40 | 4500 | 6.5 | 320 | 8.86 | 200 | ○(A) | No | Example |
| 8 | B | 1 | $2 \cdot D \cdot (t \cdot T/(F \cdot d))^{1/2}$ | 6 | 40 | 4000 | 7.0 | 300 | 0.72 | 20 | ○(A) | No | Example |
| 9 | B | 4 | $(6 \cdot D - 8) \cdot (t \cdot T/(F \cdot d))^{1/2}$ | 6 | 40 | 4000 | 7.0 | 300 | 5.78 | 100 | ○(A) | No | Example |
| 10 | B | 3 | $(6 \cdot D - 8) \cdot (t \cdot T/(F \cdot d))^{1/2}$ | 6 | 200 | 4000 | 7.5 | 300 | 3.61 | 40 | ○(A) | No | Example |
| 11 | C | 1 | $2 \cdot D \cdot (t \cdot T/(F \cdot d))^{1/2}$ | 6 | 40 | 3000 | 6.0 | 240 | 0.81 | 10 | ○(A) | No | Example |
| 12 | C | 3 | $(6 \cdot D - 8) \cdot (t \cdot T/(F \cdot d))^{1/2}$ | 6 | 40 | 3000 | 6.0 | 240 | 4.04 | 20 | ○(A) | No | Example |
| 13 | D | 1 | $2 \cdot D \cdot (t \cdot T/(F \cdot d))^{1/2}$ | 6 | 40 | 5000 | 6.0 | 420 | 0.76 | 80 | ○(A) | No | Example |
| 14 | D | 4 | $(6 \cdot D - 8) \cdot (t \cdot T/(F \cdot d))^{1/2}$ | 6 | 40 | 5000 | 6.0 | 420 | 6.07 | 100 | ○(A) | No | Example |
| 15 | E | 3 | $(6 \cdot D - 8) \cdot (t \cdot T/(F \cdot d))^{1/2}$ | 6 | 200 | 3000 | 6.5 | 220 | 3.30 | 40 | ○(A) | No | Example |
| 16 | E | 8 | $(D + 17) \cdot (t \cdot T/(F \cdot d))^{1/2}$ | 6 | 40 | 3000 | 6.0 | 220 | 8.25 | 140 | ○(A) | No | Example |
| 17 | F | 1 | $2 \cdot D \cdot (t \cdot T/(F \cdot d))^{1/2}$ | 6 | 40 | 5000 | 6.0 | 300 | 0.63 | 40 | ○(A) | No | Example |
| 18 | F | 4 | $(6 \cdot D - 8) \cdot (t \cdot T/(F \cdot d))^{1/2}$ | 6 | 40 | 4500 | 5.5 | 300 | 5.28 | 100 | ○(A) | No | Example |
| 19 | G | 2 | $(6 \cdot D - 8) \cdot (t \cdot T/(F \cdot d))^{1/2}$ | 6 | 40 | 5500 | 6.5 | 320 | 1.44 | 20 | ○(A) | No | Example |
| 20 | G | 4 | $(6 \cdot D - 8) \cdot (t \cdot T/(F \cdot d))^{1/2}$ | 8 | 40 | 5500 | 7.0 | 320 | 4.97 | 100 | ○(A) | No | Example |
| 21 | H | 1.5 | $2 \cdot D \cdot (t \cdot T/(F \cdot d))^{1/2}$ | 6 | 40 | 6000 | 6.0 | 360 | 1.15 | 40 | ○(A) | No | Example |
| 22 | H | 3 | $(6 \cdot D - 8) \cdot (t \cdot T/(F \cdot d))^{1/2}$ | 6 | 40 | 5000 | 6.0 | 360 | 3.83 | 120 | ○(A) | No | Example |
| 23 | I | 1 | $2 \cdot D \cdot (t \cdot T/(F \cdot d))^{1/2}$ | 6 | 40 | 5000 | 6.5 | 400 | 0.72 | 20 | ○(A) | No | Example |
| 24 | I | 3 | $(6 \cdot D - 8) \cdot (t \cdot T/(F \cdot d))^{1/2}$ | 6 | 40 | 6500 | 7.5 | 280 | 3.61 | 100 | ○(A) | No | Example |
| 25 | J | 1 | $2 \cdot D \cdot (t \cdot T/(F \cdot d))^{1/2}$ | 6 | 40 | 4000 | 7.5 | 280 | 0.65 | 40 | ○(A) | No | Example |
| 26 | J | 3 | $(6 \cdot D - 8) \cdot (t \cdot T/(F \cdot d))^{1/2}$ | 8 | 40 | 4500 | 8.0 | 340 | 3.26 | 60 | ○(A) | No | Example |
| 27 | K | 1 | $2 \cdot D \cdot (t \cdot T/(F \cdot d))^{1/2}$ | 6 | 40 | 5000 | 8.0 | 340 | 0.66 | 40 | ○(A) | No | Example |
| 28 | K | 3 | $(6 \cdot D - 8) \cdot (t \cdot T/(F \cdot d))^{1/2}$ | 6 | 40 | 4500 | 7.5 | 320 | 3.30 | 100 | ○(A) | No | Example |
| 29 | L | 1 | $2 \cdot D \cdot (t \cdot T/(F \cdot d))^{1/2}$ | 6 | 40 | 4500 | 7.5 | 320 | 0.70 | 40 | ○(A) | No | Example |
| 30 | L | 3 | $(6 \cdot D - 8) \cdot (t \cdot T/(F \cdot d))^{1/2}$ | 6 | 40 | 4500 | 8.0 | 320 | 3.50 | 80 | ○(A) | No | Example |
| 31 | M | 1 | $2 \cdot D \cdot (t \cdot T/(F \cdot d))^{1/2}$ | 6 | 40 | 4500 | 8.0 | 320 | 0.70 | 40 | ○(A) | No | Example |
| 32 | M | 3 | $(6 \cdot D - 8) \cdot (t \cdot T/(F \cdot d))^{1/2}$ | 6 | 40 | 5000 | 8.0 | 320 | 3.50 | 100 | ○(A) | No | Example |
| 33 | N | 1 | $2 \cdot D \cdot (t \cdot T/(F \cdot d))^{1/2}$ | 6 | 40 | 5000 | 7.5 | 340 | 0.74 | 60 | ○(A) | No | Example |
| 34 | N | 3 | $(6 \cdot D - 8) \cdot (t \cdot T/(F \cdot d))^{1/2}$ | 6 | 40 | 5000 | 7.5 | 340 | 3.70 | 120 | ○(A) | No | Example |
| 35 | O | 0.5 | $2 \cdot D \cdot (t \cdot T/(F \cdot d))^{1/2}$ | 6 | 40 | 5000 | 7.0 | 400 | 0.45 | 20 | ○(A) | No | Example |
| 36 | O | 2 | $(6 \cdot D - 8) \cdot (t \cdot T/(F \cdot d))^{1/2}$ | 6 | 40 | 5000 | 7.0 | 400 | 1.81 | 100 | ○(A) | No | Example |
| 37 | P | 0.5 | $2 \cdot D \cdot (t \cdot T/(F \cdot d))^{1/2}$ | 6 | 40 | 5500 | 6.5 | 420 | 0.41 | 10 | ○(A) | No | Example |
| 38 | P | 2 | $(6 \cdot D - 8) \cdot (t \cdot T/(F \cdot d))^{1/2}$ | 8 | 40 | 5500 | 6.5 | 420 | 1.44 | 60 | ○(A) | No | Example |
| 39 | Q | 1 | $2 \cdot D \cdot (t \cdot T/(F \cdot d))^{1/2}$ | 6 | 40 | 5000 | 6.5 | 400 | 0.85 | 40 | ○(A) | No | Example |
| 40 | Q | 2 | $(6 \cdot D - 8) \cdot (t \cdot T/(F \cdot d))^{1/2}$ | 6 | 40 | 5000 | 8.0 | 400 | 1.70 | 100 | ○(A) | No | Example |
| 41 | R | 2 | $(6 \cdot D - 8) \cdot (t \cdot T/(F \cdot d))^{1/2}$ | 8 | 40 | 5000 | 8.0 | 300 | 1.11 | 60 | ○(A) | No | Example |
| 42 | R | 6 | $(D + 17) \cdot (t \cdot T/(F \cdot d))^{1/2}$ | 8 | 40 | 5000 | 8.0 | 300 | 6.37 | 160 | ○(A) | No | Example |
| 43 | A | 4 | $(6 \cdot D - 8) \cdot (t \cdot T/(F \cdot d))^{1/2}$ | 6 | 40 | 3000 | 5.0 | 320 | 6.68 | 5 | X(F) | No | Comparative example |
| 44 | B | 8 | $(D + 17) \cdot (t \cdot T/(F \cdot d))^{1/2}$ | 6 | 40 | 3500 | 7.0 | 300 | 9.66 | 5 | X(F) | No | Comparative example |
| 45 | D | 4.5 | $(6 \cdot D - 8) \cdot (t \cdot T/(F \cdot d))^{1/2}$ | 4 | 40 | 3000 | 6.0 | 420 | 11.39 | 10 | X(F) | No | Comparative example |

TABLE 2-continued

| Condition No. | Sheet combination No. | Axis misalignment amount (mm) | Applied formula | Electrode tip diameter (mm) | Electrode tip radius of curvature (mm) | Electrode force (N) | Welding current (kA) | Welding time (ms) | Result of applied formula | Holding time (ms) | Cracking evaluation | Existing weld | |
|---|---|---|---|---|---|---|---|---|---|---|---|---|---|
| 46 | H | 4 | $(6 \cdot D - 8) \cdot (t \cdot T/(F \cdot d))^{1/2}$ | 6 | 40 | 4000 | 7.0 | 360 | 7.51 | 5 | X(F) | No | Comparative example |
| 47 | K | 8 | $(D + 17) \cdot (t \cdot T/(F \cdot d))^{1/2}$ | 6 | 40 | 4500 | 9.0 | 340 | 8.25 | 5 | X(F) | No | Comparative example |
| 48 | O | 3.5 | $(6 \cdot D - 8) \cdot (t \cdot T/(F \cdot d))^{1/2}$ | 6 | 40 | 4000 | 7.5 | 400 | 6.59 | 5 | X(F) | No | Comparative example |
| 49 | A | 0.5 | $2 \cdot D \cdot (t \cdot T/(F \cdot d))^{1/2}$ | 6 | 40 | 3500 | 6.0 | 320 | 0.39 | 10 | ○(A) | No | Example |
| 50 | I | 0.5 | $2 \cdot D \cdot (t \cdot T/(F \cdot d))^{1/2}$ | 6 | 40 | 5000 | 6.5 | 400 | 0.36 | 10 | ○(A) | No | Example |
| 51 | S | 3 | $(6 \cdot D - 8) \cdot (t \cdot T/(F \cdot d))^{1/2}$ | 6 | 40 | 5000 | 6.5 | 420 | 4.94 | 10 | ○(B) | No | Example |
| 52 | T | 3.5 | $(6 \cdot D - 8) \cdot (t \cdot T/(F \cdot d))^{1/2}$ | 6 | 40 | 5000 | 7.5 | 400 | 5.16 | 10 | ○(B) | No | Example |
| 53 | S | 4 | $(6 \cdot D - 8) \cdot (t \cdot T/(F \cdot d))^{1/2}$ | 6 | 40 | 4500 | 6.0 | 400 | 8.33 | 10 | ○(C) | No | Example |
| 54 | T | 4.5 | $(6 \cdot D - 8) \cdot (t \cdot T/(F \cdot d))^{1/2}$ | 6 | 40 | 3000 | 6.0 | 400 | 8.70 | 10 | ○(C) | No | Example |
| 55 | A | 2 | $(6 \cdot D - 8) \cdot (t \cdot T/(F \cdot d))^{1/2}$ | 6 | 40 | 4000 | 6.0 | 320 | 1.45 | 100 | ○(A) | Yes L = 15 mm | Example |
| 56 | E | 2 | $(6 \cdot D - 8) \cdot (t \cdot T/(F \cdot d))^{1/2}$ | 6 | 40 | 3000 | 6.5 | 220 | 1.32 | 100 | ○(A) | Yes L = 8 mm | Example |
| 57 | T | 3.5 | $(6 \cdot D - 8) \cdot (t \cdot T/(F \cdot d))^{1/2}$ | 6 | 40 | 3500 | 6.0 | 400 | 5.51 | 10 | ○(B) | Yes L = 5.5 mm | Example |

REFERENCE SIGNS LIST 1, 2, 6 Steel sheet
3, 4 Electrode
5 Weld (nugget)

The invention claimed is:

1. A resistance spot welding method for joining together a plurality of overlapping steel sheets of a sheet combination, the method comprising squeezing the sheet combination between a pair of electrodes and passing a current through the sheet combination while applying an electrode force thereto,
wherein at least one of the plurality of steel sheets is a surface-treated steel sheet including a metal coating layer and
the method satisfies the following relationships, $$2 \cdot D \cdot (t \cdot T/(F \cdot d))^{1/2} \leq H \text{ when } 0 \leq D < 2$$

$$(6 \cdot D - 8) \cdot (t \cdot T/(F \cdot d))^{1/2} \leq H \text{ when } 2 \leq D < 5$$

$$(D + 17) \cdot (t \cdot T/(F \cdot d))^{1/2} \leq H \text{ when } 5 \leq D < 10$$

where H (ms) is an electrode force retaining time after completion of current passage, D (mm) is an amount of axis misalignment between the electrodes, wherein D is greater than or equal to 0.5, t (mm) is a total sum of sheet thicknesses of the plurality of overlapping steel sheets, T (MPa) is a tensile strength of a steel sheet having a highest tensile strength among the plurality of steel sheets, F (N) is an electrode force, and d (mm) is a tip diameter of one electrode of the pair of electrodes, wherein if the pair of electrodes have different tip diameters, d (mm) is the tip diameter of the one of the pair of electrodes having a smaller tip diameter.

2. The resistance spot welding method according to claim 1, wherein the metal coating layer having a melting point lower than a melting point of a base material of the surface-treated steel sheet.

3. The resistance spot welding method according to claim 1, wherein the metal coating layer is a Zn-based coating layer or an Al-based coating layer.

4. The resistance spot welding method according to claim 1, wherein at least one of the plurality of steel sheets has a tensile strength greater than or equal to 590 MPa.

5. The resistance spot welding method according to claim 1, wherein, when there are one or more existing welds around a welding point, a distance L between a center of the welding point and a center of one existing weld of the one or more existing welds is set to greater than or equal to 6.0 mm to perform welding, the one existing weld being closest to the welding point, among the one or more existing welds.

6. A method for producing a welded member, the method comprising the steps of:
providing a sheet combination by arranging a plurality of steel sheets to overlap each other, at least one of the steel sheets being a surface-treated steel sheet including a metal coating layer; and
welding the sheet combination by using the resistance spot welding method according to claim 1.

7. A resistance spot welding method for joining together a plurality of overlapping steel sheets of a sheet combination, the method comprising squeezing the sheet combination between a pair of electrodes and passing a current through the sheet combination while applying an electrode force thereto,
wherein at least one of the plurality of steel sheets is a surface-treated steel sheet including a metal coating layer, and
the method satisfies the following relationships, $$2 \cdot D \cdot (t \cdot T \cdot R/(40 \cdot F \cdot d))^{1/2} \leq H \text{ when } 0 \leq D < 2$$

$$(6 \cdot D - 8) \cdot (t \cdot T \cdot R/(40 \cdot F \cdot d))^{1/2} \leq H \text{ when } 2 \leq D < 5$$

$$(D + 17) \cdot (t \cdot T \cdot R/(40 \cdot F \cdot d))^{1/2} \leq H \text{ when } 5 \leq D < 10$$

where H (ms) is an electrode force retaining time after completion of current passage, D (mm) is an amount of axis misalignment between the electrodes, wherein D is greater than or equal to 0.5, t (mm) is a total sum of sheet thicknesses of the plurality of overlapping steel sheets, T (MPa) is a tensile strength of a steel sheet having a highest tensile strength among the plurality of steel sheets, F (N) is an electrode force, d (mm) is a tip diameter of one electrode of the pair of electrodes, wherein if the pair of electrodes have different tip diameters, d (mm) is the tip diameter of the one of the pair of electrodes having a smaller tip diameter, and R (mm) is an electrode tip radius of curvature of one electrode of the pair of electrodes, wherein if the pair of electrodes have different electrode tip radii of curvature, R (mm) is the electrode tip radius of curvature of the one of the pair of electrodes having a smaller electrode tip radius of curvature, R satisfying $40 \leq R \leq 200$.

8. The resistance spot welding method according to claim 7, wherein the metal coating layer having a melting point lower than a melting point of a base material of the surface-treated steel sheet.

9. The resistance spot welding method according to claim 7, wherein the metal coating layer is a Zn-based coating layer or an Al-based coating layer.

10. The resistance spot welding method according to claim 7, wherein at least one of the plurality of steel sheets has a tensile strength greater than or equal to 590 MPa.

11. The resistance spot welding method according to claim 7, wherein, when there are one or more existing welds around a welding point, a distance L between a center of the welding point and a center of one existing weld of the one or more existing welds is set to greater than or equal to 6.0 mm to perform welding, the one existing weld being closest to the welding point, among the one or more existing welds.

12. A method for producing a welded member, the method comprising the steps of:
providing a sheet combination by arranging a plurality of steel sheets to overlap each other, at least one of the steel sheets being a surface-treated steel sheet including a metal coating layer; and
welding the sheet combination by using the resistance spot welding method according to claim 7.

* * * * *